United States Patent [19]

Kakeno

[11] 4,284,993

[45] Aug. 18, 1981

[54] MULTI-NOZZLE HEAD FOR INK JET PRINTER WITH INK SUPPLY PIPE IN INK CHAMBER

[75] Inventor: Sadao Kakeno, Yokohama, Japan

[73] Assignee: Ricoh Co., Ltd., Tokyo, Japan

[21] Appl. No.: 120,991

[22] Filed: Feb. 13, 1980

[30] Foreign Application Priority Data

Feb. 23, 1979 [JP] Japan .................................. 54-20473

[51] Int. Cl.$^{3}$ .............................................. G01D 15/18

[52] U.S. Cl. .................................. 346/75; 346/140 R

[58] Field of Search .............................. 346/75, 140 IJ

[56] References Cited

U.S. PATENT DOCUMENTS

| | | | |
|---|---|---|---|
| 4,138,687 | 2/1979 | Cha et al. | 346/75 |
| 4,194,210 | 3/1980 | Krause | 346/75 |

*Primary Examiner*—George H. Miller, Jr.

*Attorney, Agent, or Firm*—Burgess, Ryan and Wayne

[57] ABSTRACT

An ink jet head comprises a nozzle unit having a plurality of nozzles and a vibration unit having vibrating plates opposite to the nozzles. One or more ink distributing pipes having a plurality of ink outlets are arranged in parallel with the rectilinear nozzles, whereby the ink under uniform pressure is applied from the ink outlets of one or more pipes to the nozzles and the ink drops in the same size are jetted from the nozzles respectively.

8 Claims, 13 Drawing Figures

MULTI-NOZZLE HEAD FOR INK JET PRINTER WITH INK SUPPLY PIPE IN INK CHAMBER

BACKGROUND OF THE INVENTION

The present invention relates to generally a multi-nozzle print head for ink jet printers of the type wherein the ink jets issue under the same pressure through all the ink jet nozzles from a common ink chamber.

In general, in the prior art multi-nozzle head, because the ink under pressure flows into the ink chamber through an ink supply inlet formed through one end wall of the head the ink pressure decreases in the ink chambers distant from the ink inlet hole and consequently the ink is jetted under various pressures through the nozzles. As a result, ink drops of the same size are not jetted from the nozzles and consequently the ink drops deposited on a recording medium vary in size from one nozzle to another, resulting in irregularities of recorded patterns.

In order to overcome this defect, there has been invented and used a multi-nozzle head of the type wherein the ink under pressure is made to flow through a plurality of ink distributing pipes spaced apart from each other in the direction of the ink jet nozzles and communicated with an ink pressure equalizing pipe extended to the exterior of the main body of the head, whereby the uniform pressure distribution in the ink chamber may be ensured. However, in practice this arrangement is disadvantageous in that the interconnection between the main body and the pressure equalizing pipe through a relatively large number of ink distributing pipes is cumbersome and therefore the manufacturing process is very time-consuming.

SUMMARY OF THE INVENTION

One of the objects of the present invention is therefore to provide a multi-nozzle head for ink jet printers which is very simple in construction and compact in size yet capable of jetting the ink under the same pressure throughout all the ink jet nozzles.

Another object of the present invention is to provide a multi-nozzle head wherein one or more vertically spaced ink distributing pipes each formed with a rectilinear array of ink issuing holes are extended through the ink chamber, whereby uniform ink pressure distribution may be maintained in the ink chamber and therefore the ink under the same pressure may be jetted through all the nozzles.

The above and other objects, effects, features and advantages of the present invention will become more apparent from the following description of some preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
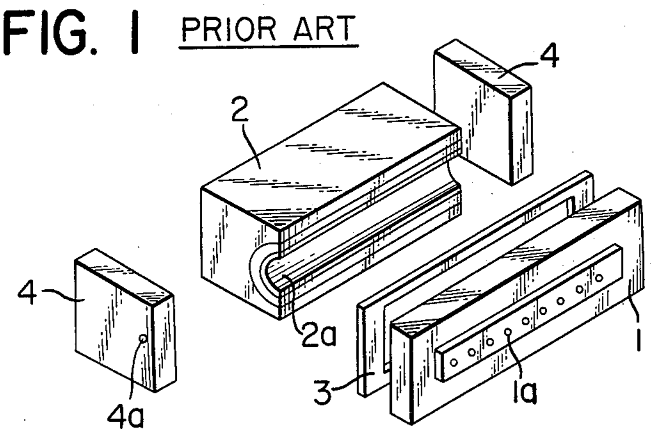
FIG. 1 PRIOR ART
FIG. 1 is an exploded view of an example of the prior art multi-nozzle ink drop generators.
Figure 2:
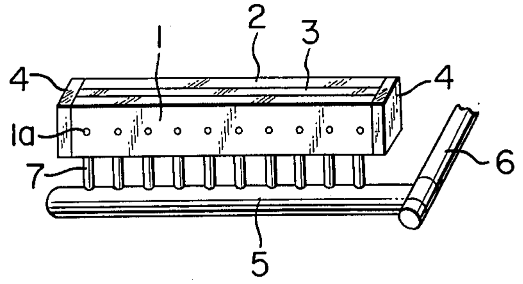
FIG. 2 PRIOR ART
FIG. 2 is a perspective view of another example of the prior art ink drop generators.

Prior Art, FIGS. 1 and 2

Prior to the description of the preferred embodiments of the present invention, some prior art multi-nozzle heads will be described briefly with reference to FIGS. 1 and 2 in order to distinctly point out their deficiencies.

Referring first to FIG. 1, the prior art multi-nozzle head comprises in general a nozzle plate 1 formed with an array of nozzles 1*a*, a main body 2 having a semicylindrical diaphragm 2*a* which vibrates in response to the input signal, a gasket 3 interposed between the nozzle plate 1 and the main body 2 and two end plates or walls 4 one of which is formed with an ink inlet port 4*a*. The ink chamber (not shown) in the multi-nozzle head communicates with both the nozzles 1*a* and the ink inlet port 4*a* which in turn are in communication with an ink reservoir (not shown), whereby the ink chamber is normally filled with the ink under pressure. As the diaphragm 2*a* vibrates, ink drops are jetted through the nozzles 1*a*.

Since the ink under pressure is supplied to the ink chamber only through the ink inlet port 4*a* formed through one end wall 4, the ink pressure in the ink chamber gradually drops as the distance of separation from the ink inlet port 4*a* increases. As a result, the ink drops issuing from the nozzles 1*a* are not uniform in size so that the deposited ink drops are not uniform.

In the multi-nozzle head shown in FIG. 2, the ink under pressure is supplied from an ink reservoir (not shown) through an ink supply pipeline 6, a pressure equalization pipe 5 and a plurality of spaced apart distributing pipes 7 to the ink chamber. Since the ink under pressure is supplied through the ink pressure equalization pipe 5, the pressure of the ink distributed through the distributing pipes 7 may be equalized, but this type ink drop generator presents some problems which are described below.

Firstly, because of a relatively large number of distributing pipes 7, the interconnection between the main body 2 and the pressure equalization pipe 5 is cumbersome and this type of head is time consuming to manufacture. Secondly, because of the provision of the pressure equalization pipe 5, the multi-nozzle head is large in size. In addition, the length of the ink supply system becomes longer, consequently the amount of ink in the supply system is increased and deterioration of ink in the supply system results.

Figure 3:
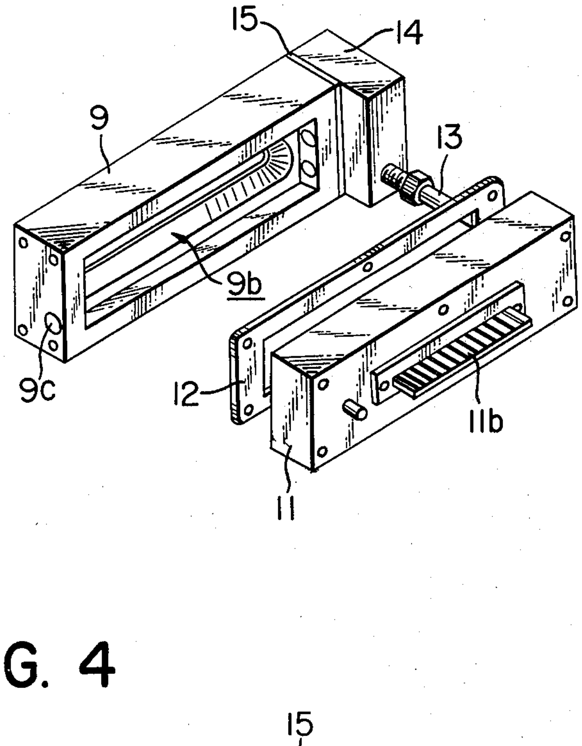
FIG. 3 is an exploded, perspective view of a first embodiment of the present invention.
Figure 4:
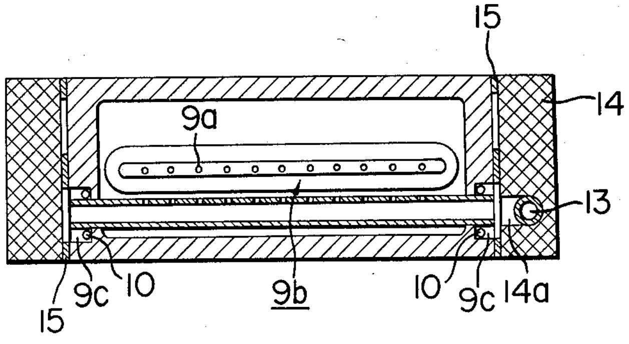
FIG. 4 is a longitudinal sectional view thereof.
Figure 5:
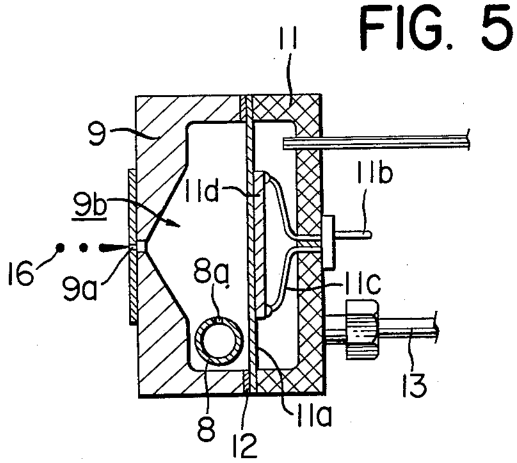
FIG. 5 is a cross sectional view thereof.

First Embodiment, FIGS. 3, 4 and 5

The first embodiment of the present invention shown in FIGS. 3, 4 and 5 comprises in general a nozzle unit 9 and a vibration unit 11 which are joined together liquid-tightly with a gasket 12. As best shown in FIG. 4, the nozzle unit 9 is formed with a rectilinear array of nozzles 9*a* and its opposing side walls are formed with holes 9*c* for receiving the ends of a pipe 8. Pipe 8, which is formed with an array of ink outlet ports 8*a*, extends lengthwise through the nozzle unit 9, and its ends are liquid-tightly sealed in the holes 9*c* through O-rings 10.

The vibration unit 11 has a vibrating plate 11*a* on which are mounted piezo-electric elements or crystals 11*d* which in turn are electrically connected through lead wires 11*c* to a connector 11*b* mounted on the rear wall of the vibration unit 11.

The ink under pressure is supplied from an ink reservoir (not shown) through an ink supply pipe 13 and an ink passage 14*a* in a end piece 14 into the pipe 8 extended through the ink chamber. The end piece 14 is attached liquid-tightly to the nozzle units 9 and 11 through a gasket 15.

Next, the mode of operation of the first embodiment with the above construction will be described. The ink under pressure flows through the supply pipe 13 and the passage 14*a* in the end piece 14 into the pipe 8 and is uniformly distributed through the outlet ports 8*a* into the ink chamber 9*b*. As a result, the nozzles 9*a* may receive ink at a uniform pressure so that the ink from the nozzles 9*a* may be jetted into drops uniform in size. Consequently, the image qualities of the recorded characters, patterns or the like may be considerably improved.

Figure 6:
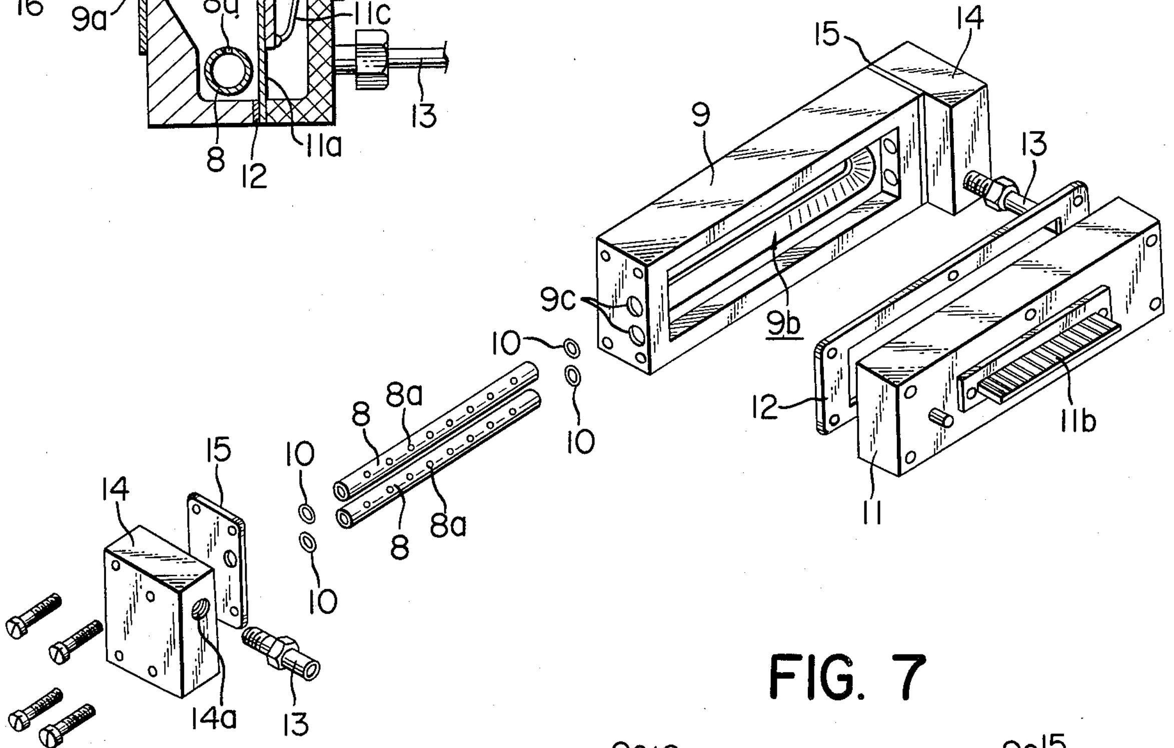
FIG. 6 is an exploded perspective view of a second embodiment of the present invention.
Figure 7:
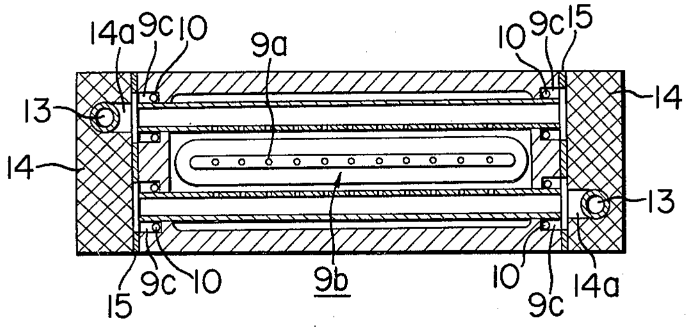
FIG. 7 is a longitudinal sectional view thereof.
Figure 8:
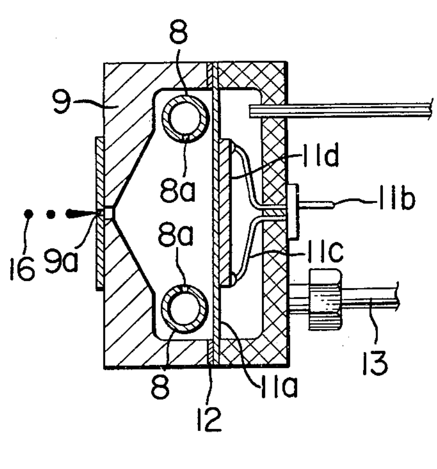
FIG. 8 is a cross sectional view thereof.

Second Embodiment, FIGS. 6, 7 and 8

The second embodiment shown in FIGS. 6, 7 and 8 is substantially similar in construction to the first embodiment described above with reference to FIGS. 3, 4 and 5 except that two ink distributing pipes 8 are extended lengthwise through the ink chamber 9*b* and are spaced vertically from each other by a predetermined distance. One end of the ink distribution pipes 8 communicate through the end pieces 14 to the ink supply pipes 13 in a manner substantially similar to that described above. That is, the left end of the lower ink distributing pipe 8 communicates through the end piece 14 with the supply pipe 13 while the right end of the upper ink distributing pipe 8 communicates through the left end piece 14 with the left ink supply pipe 13.

In operation, the ink under pressure flows into the upper ink distributing pipe 8 from the left end thereof so that the pressure of the ink issuing through the outlet ports 8*a* gradually decreases as the distance from the left end of the upper pipe 8 increases. In like manner, the ink under pressure flows into the lower ink distributing pipe 8 from the right end thereof so that the pressure of the ink issuing through the ink outlet ports 8*a* decreases gradually as the distance from the right end of the lower pipe 8 increases. As a consequence, the ink flows under high and low pressures are mixed in the ink chamber 9*b* so that the ink pressure may be equalized and consequently, the ink issues through the nozzles 9*a* under the same pressure. As the diaphragm 11*a* is vibrated, the jet of ink issuing through each nozzle 9*a* breaks into a stream of ink drops uniform in size.

Figure 9:
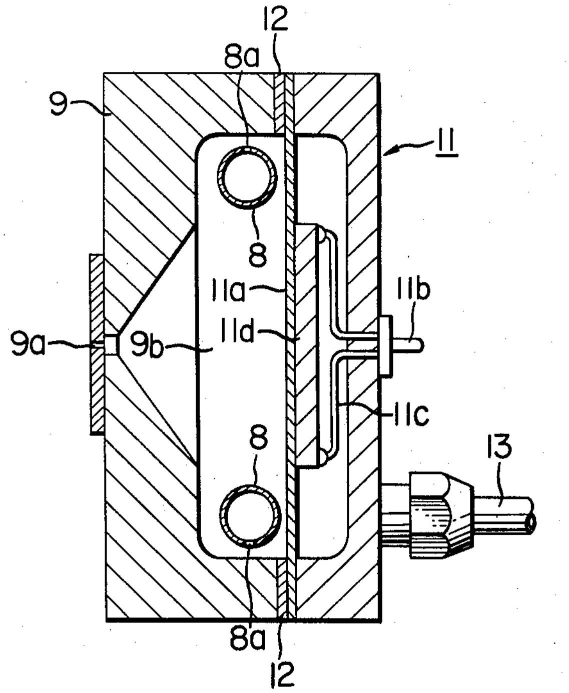
FIG. 9 is a cross sectional view of a third embodiment of the present invention.

Third Embodiment, FIG. 9

The third embodiment shown in FIG. 9 is substantially similar in construction to the second embodiment described above with reference to FIGS. 5, 6 and 7 except that while in the second embodiment the ink outlet ports 8*a* of the upper and lower ink distributing pipes 8 are directed towards the ink jet nozzles 9, they are directed to the upper and lower walls respectively in the third embodiment.

In operation, therefore, the ink issuing through each of the outlet ports 8*a* of the upper pipe 8 impinges against the upper wall of the ink chamber 9*b* and is divided into two streams. One stream flows along the upper wall and then the front wall of the ink chamber 9*b* towards the nozzles 9*a* while the other stream flows along the upper wall and then along the diaphragm 11*a* and then towards the nozzles 9*a*. In like manner, the ink issuing from each of the ink outlet ports 8*a* of the lower ink distributing pipe 8 impinges against the bottom wall of the ink chamber 9*b* and is divided in general into two streams. One stream flows along the bottom wall and then along the front wall towards the nozzles 9*a* while the other stream flows along the bottom wall and then along the diaphragm 11*a* and towards the nozzles 9*a*. Thus all the ink issuing into the ink chamber 9*b* is circulated and intermixed so that the weak and slow ink streams flow towards the nozzles 9*a*. As a result, the ink adjacent to each nozzle 9*a* will not be disturbed so that the smooth supply of ink towards the nozzles 9*a* may be ensured. In addition, there is the advantage in that the uniform vibrations may be transmitted from the diaphragm 11*a* towards the ink adjacent to the nozzles 9*a*. Furthermore even when the pressure variation in the ink reservoir is transmitted through the supply pipes 13 and end pieces 14 to the ink chamber 9*b*, it is immediately absorbed so that the variations in pressure of the ink adjacent to the nozzles 9*a* may be minimized. Moreover the ink issuing into the ink chamber 9*b* is circulated therethrough before it flows towards the nozzles 9*a*, whereby stagnation of ink within the ink chamber 9*b* may be avoided.

Figure 10:
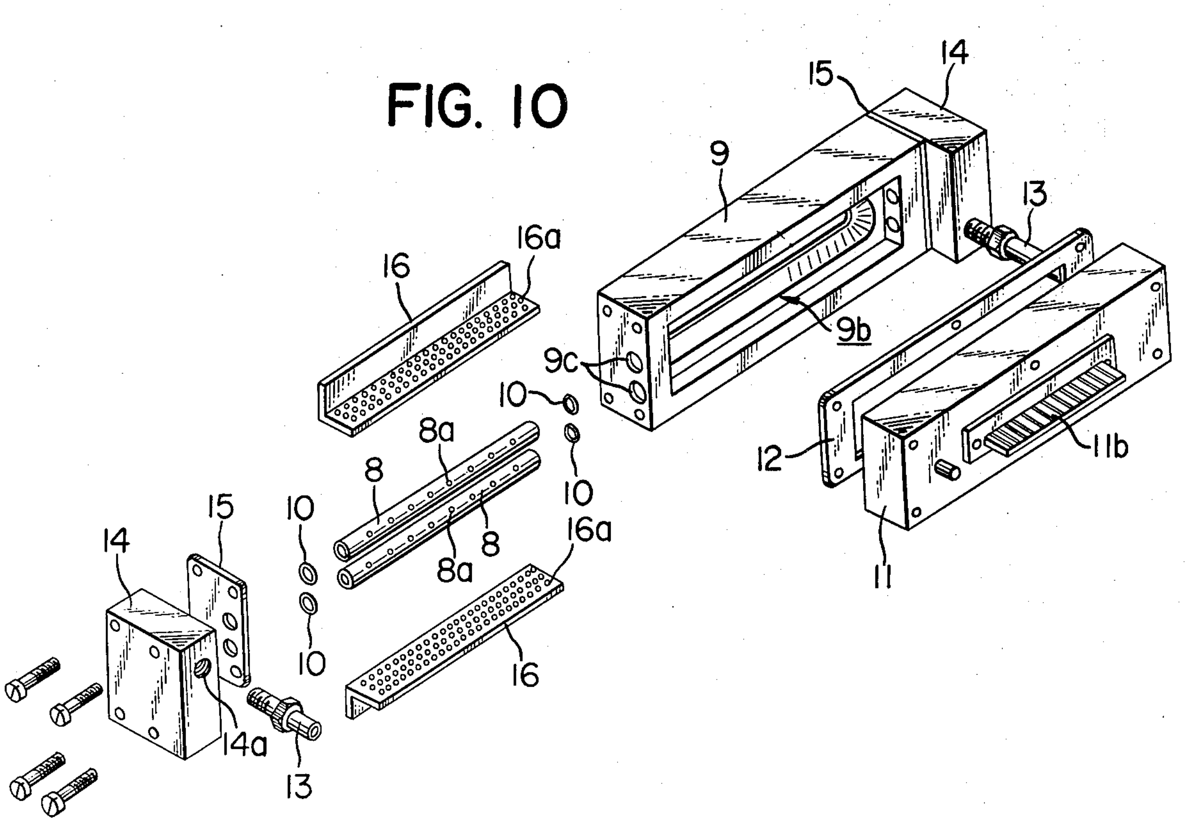
FIG. 10 is an exploded perspective view of a fourth embodiment of the present invention.
Figure 11:
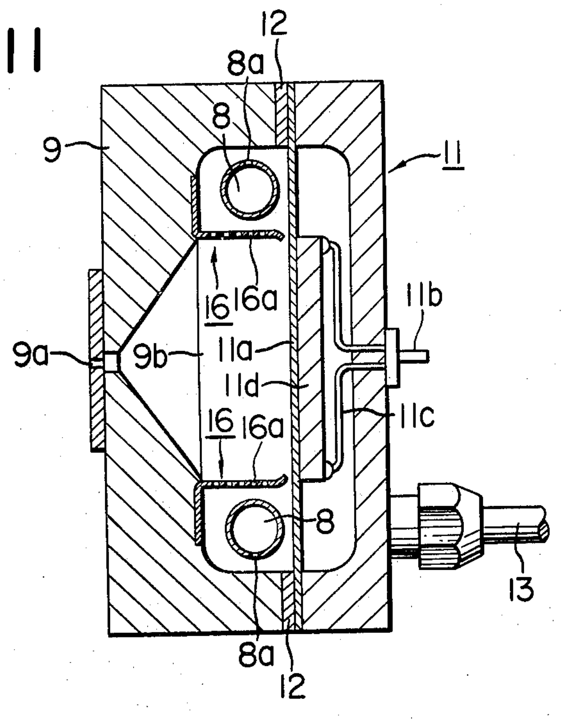
FIG. 11 is a cross sectional view thereof.

Fourth Embodiment, FIGS. 10 and 11

The fourth embodiment shown in FIGS. 10 and 11 is substantially similar in construction to the third embodiment described above with reference to FIG. 9 except that ink rectifying plates 16 each formed with a large number of small holes 16*a* are placed below and above, respectively, the upper and lower ink distributing pipes 8.

In operation, therefore, the ink which issues through the ink outlet ports 8*a* of the upper or lower ink distributing pipe 8 and is deflected by the upper or lower wall of the ink chamber 9*b* so as to flow downwards or upwards is further distributed through the small holes 16*a* of the ink rectifying plate 16.

For instance, when the ratio of the diameter of the ink outlet port 8*a* to that of the small hole 16*a*, is 2:1 and the ratio of the total area of the ink outlet ports 8*a* to that of the small holes 16*a* of the ink rectifying plate 16 is 1:10, the ink issuing through the ink outlet port 8*a* at a velocity of 20 mm/sec is slowed down to a weak and slow velocity of 2 mm/sec when it reaches the nozzles 9*a* because the ink issuing through the outlet ports 8*a* first impinges against the upper or lower wall of the ink chamber 9*b* and then against the ink rectifying plate 16. As a result, the advantages attained by the third embodiment may be further improved in the fourth embodiment.

Figure 12:
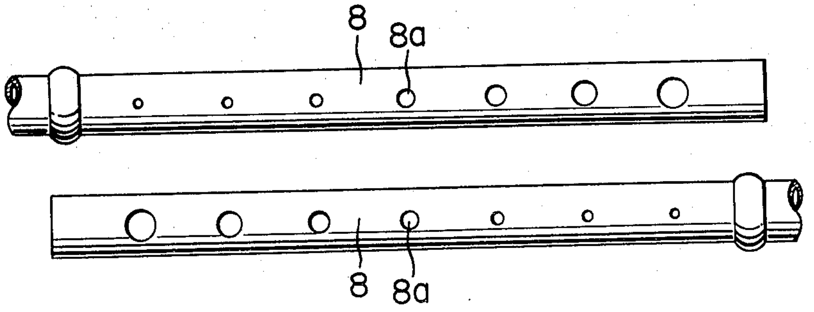
FIG. 12 is a side view of ink distributing pipes used in a fifth embodiment of the present invention.

Fifth Embodiment, FIG. 12

The fifth embodiment is substantially similar in construction to any of the preceding embodiments except that the ink outlet ports 8*a* are increased in diameter stepwise as the distance from the inlet end of the ink distributing pipe 8 increases as shown in FIG. 12. In addition, the axes of the ink outlet ports 8*a* of the upper and lower ink distributing pipes 8 are in parallel with each other in the vertical direction.

When the ink outlet ports 8*a* have the same diameter, the pressure of the ink issuing through them drops gradually or stepwise as the distance of the port from the inlet end of the pipe 8 increases as described above. However according to the fifth embodiment the diameters of the ink issuing ports 8*a* are increased stepwise as described above as the distance from the inlet end of the pipe 8 increases. As a result, the ink issues through all the ports 8*a* under the same pressure into the ink chamber 9*b*. As a result, the ink pressue is uniform throughout the ink chamber 9*b* and consequently the ink jet issues through all the nozzles 9*a* under the same pressure. Therefore, when the diaphragm 11*a* vibrates, the ink is jetted in ink drop of the same size.

Instead of extending upper and lower ink distributing pipes 8 through the ink chamber 9*b*, only one pipe 8 may be extended as in the case of the first embodiment.

Figure 13:
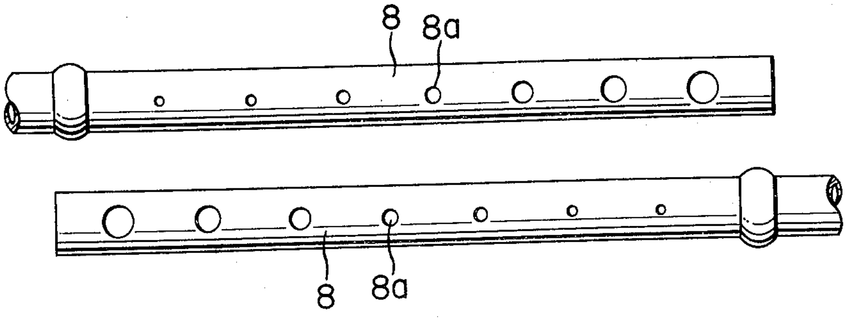
FIG. 13 is a side view of ink distributing pipes used in a sixth embodiment of the present invention.

Sixth Embodiment, FIG. 13

The sixth embodiment is substantially similar in construction to the fifth embodiment just described above except that the ink outlet ports 8*a* of the upper ink distributing pipe 8 are arranged to reside between the ports 8*a* of the lower pipe 8 as shown in FIG. 13. The sixth embodiment is advantageous over the fifth embodiment (FIG. 12) in that the number of ink outlet ports 8*a* may be decreased. That is, the ink streams issuing from the upper and lower pipes 8 under various pressures may be well intermixed so that the pressure in the ink chamber 9*b* may be equalized and maintained uniformly. As a result, the ink jets under almost the same pressure issue through the nozzles 9*a* and consequently they are jetted in the ink drops of the same size.

What is claimed is:

1. A multi-nozzle head for an ink jet printer comprising (a) a nozzle unit provided with nozzles spaced in a line from each of which the ink is jetted, (b) a vibration unit having a vibrating plate on which vibration elements are mounted opposite to said nozzles, (c) a chamber forming between a front wall provided with said nozzles of the nozzle unit and said vibrating plate, (d) at least one distributing pipe having a plurality of ink outlet ports arranged in parallel with the line of said nozzle in said chamber, said distributing pipe being connected to a supply pipe.

2. A multi-nozzle head for an ink jet printer as set forth in claim 1 wherein said ink outlet ports of said distributing pipe are directed to a side wall of said chamber.

3. A multi-nozzle head for an ink jet printer as set forth in claim 1 wherein a rectifying plate having a number of small holes is arranged between said nozzles and said at least one distributing pipe.

4. A multi-nozzle head for an ink jet printer as set forth in claim 1 having two distributing pipes arranged therein one of said distributing pipes is arranged in the upper portion of said chamber and the other distributing pipe is arranged in the lower portion.

5. A multi-nozzle head for an ink jet printer as set forth in claim 4 wherein said ink outlet ports of said two distributing pipes are directed to the upper and lower portions of said chamber.

6. A multi-nozzle head for an ink jet printer as set forth in claim 4 wherein two rectifying plates having a number of small holes are respectively arranged between said nozzles and said distributing pipes.

7. A multi-nozzle head for an ink jet printer as set forth in claim 4 wherein said ink outlet ports of the two distributing pipes are formed in such way so that the diameters of the ink outlet ports stepwisely become larger from the respective ends of the ink distributing pipes connected to said ink supply pipes to the tips of said distributing pipes.

8. A multi-nozzle head for ink jet printer as set forth in claim 7 wherein the ink outlet ports of one ink distributing pipes are positioned between ink outlet ports of the other ink distributing pipe.

* * * * *